United States Patent

Slipy et al.

[11] Patent Number: 6,120,932
[45] Date of Patent: Sep. 19, 2000

[54] BATTERY MOUNTING ASSEMBLY FOR A RADIO

[75] Inventors: Michael J. Slipy; William H. Robertson, Jr., both of Plantation; Sam Hosseini, Weston, all of Fla.

[73] Assignee: Motorola, Inc., Schaumburg, Ill.

[21] Appl. No.: 09/185,307

[22] Filed: Nov. 3, 1998

[51] Int. Cl.[7] .................................................. H01M 2/10
[52] U.S. Cl. ........................ 429/99; 429/100; 429/123; 361/814
[58] Field of Search ............................. 429/100, 99, 96, 429/123; 361/814

[56] References Cited

U.S. PATENT DOCUMENTS 5,607,791  3/1997  Garcia ........................................ 429/96
6,071,640  6/2000  Robertson, Jr. et al. ................ 429/100

Primary Examiner—John S. Maples
Attorney, Agent, or Firm—Barbara R. Doutre

[57] ABSTRACT

An improved battery mounting assembly includes a radio housing (102), a battery tray (104), and a back cover (106). The radio housing (102) includes retaining posts (130) and inserts (132). The battery tray (104) includes integrally molded latches (120) and integrally molded alignment grooves (122). The battery tray (104) retains battery cells (128) and pivotally latches to the radio housing (102) through latches (120) and corresponding inserts (132). The integrally molded alignment grooves (122) align and co-locate with the retaining posts (130) of the radio housing. The back cover (106) slides over the radio housing (102) to complete encapsulation of the cells (128).

7 Claims, 2 Drawing Sheets

BATTERY MOUNTING ASSEMBLY FOR A RADIO

This application is related to U.S. Pat. No. 6,071,640 entitled "Battery Mounting Assembly for a Radio" by William H. Robertson Jr., Michael H. Brannan, and Sam Hosseini being filed concurrently herewith.

TECHNICAL FIELD

This invention relates in general to portable radios and more specifically to the battery mounting assemblies for such radios.

BACKGROUND

There is a growing interest among consumers for very small, lightweight communications products, such as cellular telephones and two-way radios. These types of products typically call for easy to assemble and dissemble battery packs. Once inserted, it is important that the battery pack maintain proper contact with the radio. Intermittent contact can cause loss of communications and is usually caused by improper battery alignment and faulty retention mechanisms. A variety of mechanical hardware can be used to improve battery alignment and contact reliability such as slots, screws, clamps, and straps. However, an overabundance of complex hardware can cause an individual to become frustrated with the radio product. Today's radio users want fast, easy battery insertion and replacement.

Accordingly, there is a need for an improved battery mounting assembly for a radio.

DETAILED DESCRIPTION OF THE PREFERRED EMBODIMENT

Figure 1:
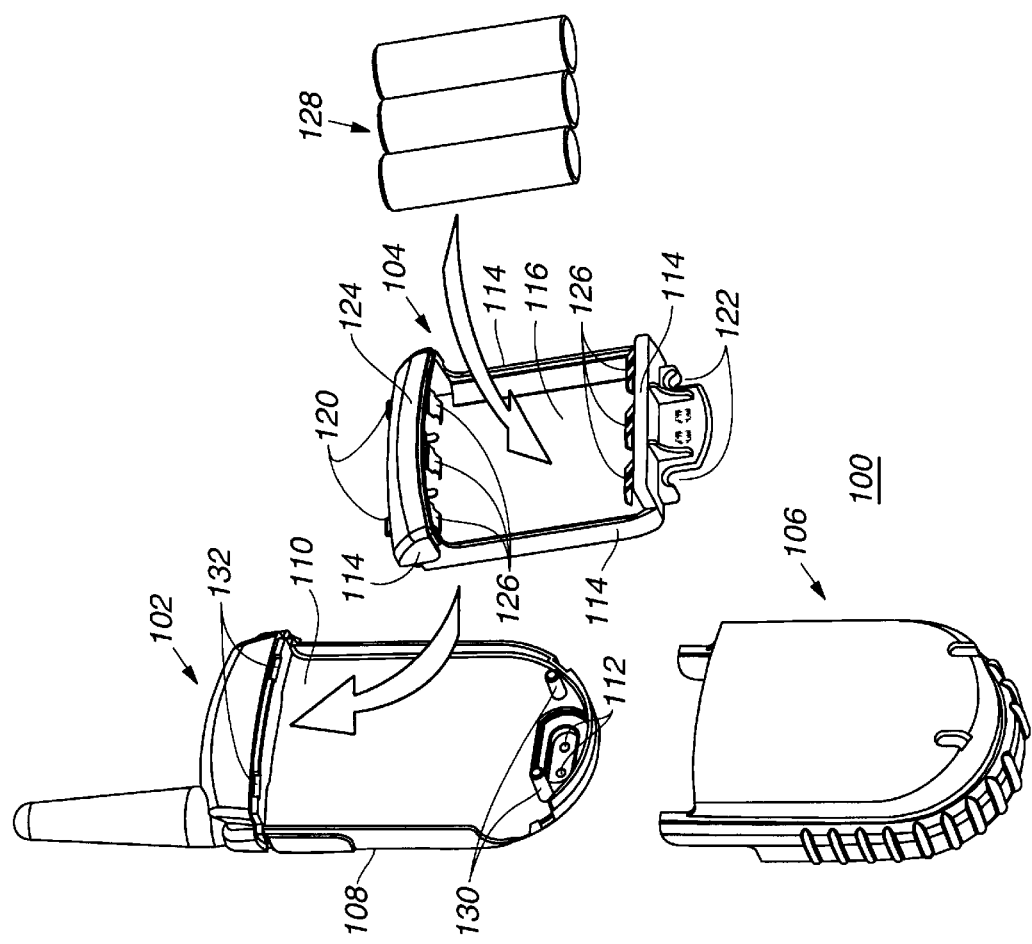
FIG. 1 is an exploded view of a battery mounting assembly in accordance with the present invention.

Referring to FIG. 1, there is shown an exploded view of a battery mounting assembly for a portable radio in accordance with the present invention. In accordance with the invention, assembly 100 includes first, second, and third housing portions 102, 104, 106 respectively. The first housing portion 102 will also be referred to as a radio housing, as well as a front housing portion. Radio housing 102 includes radio electronics (not shown) stored between front and back surfaces 108, 110 respectively. In accordance with the present invention, the radio housing 102 includes at least one retaining post 130 extending from the back surface 110 and at least one insert 132, for retaining the second housing portion 104. A set of battery contacts 112 are used to mate with corresponding contacts (shown in phantom) of the second housing portion 104.

In accordance with the present invention, the second housing portion 104 operates as, and will also be referred to as, a battery tray. In accordance with the invention, the third housing portion 106 will also be referred to as a back cover.

In accordance with the preferred embodiment of the invention, the battery tray 104 is formed of a unitarily molded frame 114, preferably made of a plastic material, within which is seated a printed circuit board 116. In accordance with the present invention, the unitarily molded frame 114 includes an integrally molded flange 124 having at least one integrally molded latch 120 extending therefrom, and at least one integrally molded alignment groove 122. The preferred embodiment of the invention is shown utilizing first and second latches 120 and first and second alignment grooves 122. The battery tray 104 further includes conductive contacts 126 for making contact to battery cells, preferably cylindrical type disposable cells, 128.

Figure 2:
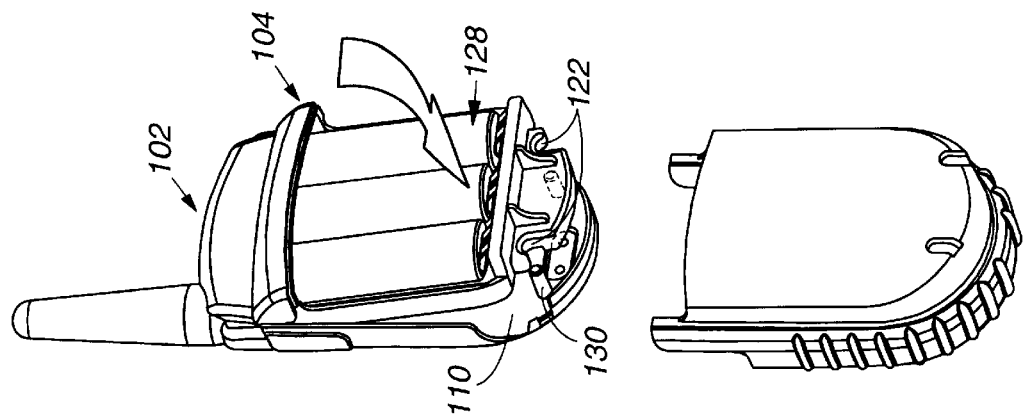
FIG. 2 is a partially assembled view of the battery mounting assembly of FIG. 1 in accordance with the present invention.
Figure 3:
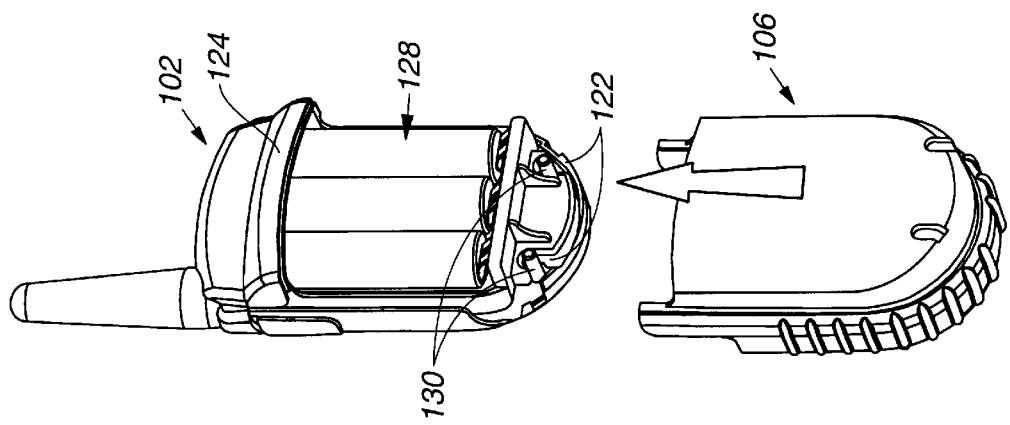
FIG. 3 is another partially assembled view of the battery mounting assembly of FIG. 1 in accordance with the present invention.

In accordance with the present invention and referring to FIG. 2, latches 120 pivotally couple within corresponding inserts 132 in the radio housing 102. The battery tray 104 thus descends pivotally downward towards the back surface 110 of the front housing portion 102. As the battery tray 104 pivots downward, the integrally molded alignment grooves 122 co-locate and align with the retaining posts 130 as shown in FIG. 3. In accordance with the present invention, the battery tray 104 is retained against the radio housing 102 by the latches 120 being coupled within the inserts 132 and the alignment grooves 122 being co-located about the retaining posts 130.

The battery cells 128 can be inserted into the battery tray 104 either before or after the tray is coupled to the radio housing 102. In accordance with the present invention, once the battery cells 128 are inserted between the conductive contacts 126 of the battery tray 104, the flange 124 encapsulates a predetermined portion of the cells. When the battery tray 104 and cells 128 are coupled to the radio housing 102, energy is transferred from the battery cells to the battery contacts 112.

Figure 5:
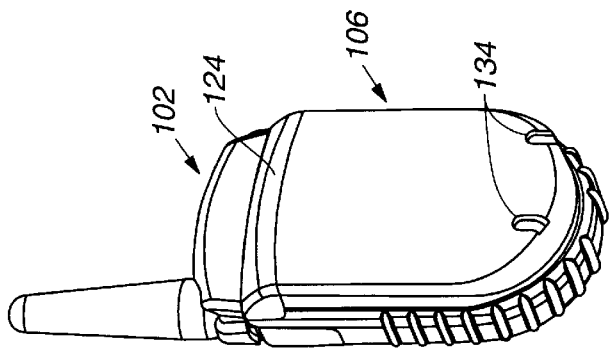
FIG. 5 is a completed assembly of the battery mounting assembly of FIG. 1 in accordance with the present invention.
Figure 4:
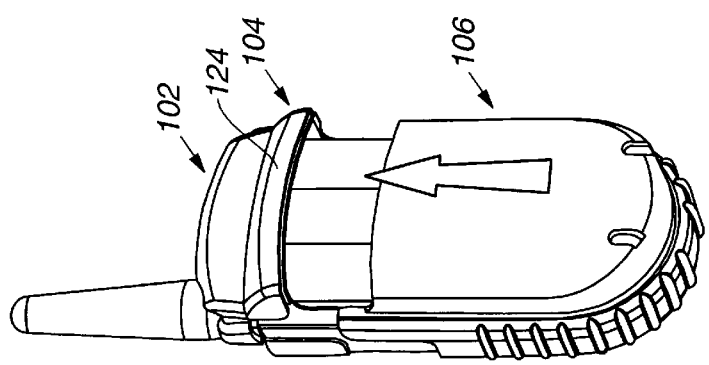
FIG. 4 is yet another partially assembled view of the battery mounting assembly of FIG. 1 in accordance with the present invention.

Once the battery tray 104 and cells 128 are coupled to the radio housing 102, the back cover 106 then slideably couples to the radio housing 102 as shown in FIG. 4, and abuts against the flange 124 thereby completing encapsulation of the battery cells 128 as shown in FIG. 5.

To provide additional retention of the back cover 106 against the radio housing 102, the back cover may further include apertures 134 to align with the retaining posts 130. The back cover is preferably formed of a single piece of molded material, preferably plastic, and the apertures 134 extend inward into tubular extensions (not shown). When the back cover 106 abuts against the flange 124, the apertures (if included) 134 capture a predetermined portion of the retaining posts 130 to provide a snap fit. The apertures 134 are designed so that the back cover 106 can still be slideably removed by pulling the back cover downward.

The battery mounting assembly of the present invention allows a user to simply perform the steps of inserting the battery tray latches 120 into the inserts 132, pivoting the battery tray 104 towards the radio housing 102 which align and co-locates the alignment grooves 122 with the retaining posts 130, inserting the cells 128 (before or after tray insertion), and sliding the back cover along the radio housing 102 to complete encapsulation of the cells. Removal of the cells 128 is accomplished by sliding off the back cover 106 and replacing the cells. The battery tray 104 of the present invention is removable so that other energizing options, such as a rechargeable battery pack having a different form factor, can be used with the same radio housing 102.

Accordingly, there has been provided an improved battery mounting assembly for a portable radio. Improved battery alignment and improved retention mechanisms have been provided for disposable cells without the use of complex hardware such as screws, pull-tabs, or fasteners. The battery mounting assembly described by the invention provides for fast, easy battery insertion and replacement.

While the preferred embodiments of the invention have been illustrated and described, it will be clear that the invention is not so limited. Numerous modifications, changes, variations, substitutions, and equivalents will occur to those skilled in the art without departing from the spirit and scope of the present invention as defined by the appended claims.

What is claimed is:

1. A battery mounting assembly, comprising:

a housing having first, second, and third housing portions;

at least one retaining post coupled to the first housing portion;

at least one insert formed within the first housing portion;

the second housing portion for receiving battery cells and including a unitarily molded frame having an integrally molded flange with at least one latch extending therefrom, the second housing portion including at least one integrally molded alignment groove, the at least one latch for latching the second housing portion to the at least one insert of the first housing portion, the at least one integrally molded alignment groove for aligning and co-locating with the at least one retaining post, and the flange for encapsulating a predetermined portion of the battery cells; and the third housing portion slideably coupling to the first housing portion and abutting against the flange so as to complete encapsulation of the battery cells.

2. A battery mounting assembly as described in claim 1, wherein the third housing portion includes at least one aperture for aligning and snap fitting with the retaining post.

3. A battery mounting assembly for a radio, comprising:

front and back housing portions, the front housing portion having front and back surfaces, the back surface having a plurality of inserts formed therein;

a plurality of retaining posts extending from the back surface of the front housing portion;

a battery tray having a plurality of latches and integrally molded alignment grooves formed therein, the battery tray latching to the plurality of inserts of the front housing portion, and the integrally molded alignment grooves aligning and co-locating with the plurality of retaining posts such that the battery tray is retained against the back surface of the front housing portion; and the back housing portion slideably coupling to the front housing portion, the battery tray being retained therebetween.

4. The battery mounting assembly of claim 3, wherein the back housing portion includes a plurality of apertures for aligning with the plurality of retaining posts.

5. A radio and battery cell assembly, comprising:

a radio housing, a battery tray, and a back cover, the radio housing having retaining posts extending therefrom and inserts formed therein;

the battery tray including:

an integrally molded flange for encapsulating a portion of the battery cell within the battery tray;

a plurality of integrally molded latches extending from the flange for pivotally latching the battery tray to the inserts of the radio housing;

a plurality of integrally molded alignment grooves for aligning and co-locating with the retaining posts; and the back cover slideably coupling to the radio housing and abutting with the flange so as to complete encapsulation of the battery cells within the radio.

6. The radio of claim, 5 wherein the back cover includes first and second apertures for aligning with the first and second retaining posts.

7. A radio, comprising:

a radio housing having front and back surfaces, the back surface having first and second retaining posts extending therefrom and first and second inserts formed therein;

a battery tray for retaining a plurality of battery cells, the battery tray having first and second integrally molded latches for latching the battery tray to the first and second inserts of the back surface of the radio housing, and the battery tray having first and second integrally molded alignment grooves for aligning and co-locating with the first and second retaining posts; and a back cover for slideably coupling to the radio housing and retaining the battery tray and battery cells against the back surface of the radio housing.

* * * * *